APPARATUS FOR PERFORMING IMAGE CORRELATION

Filed July 7, 1965

WITNESSES

Theodore F. Wrobel

R. Lewis Gable

INVENTOR
Arthur S. Jensen

BY Charles F. Renz
ATTORNEY

June 3, 1969 A. S. JENSEN 3,448,281

APPARATUS FOR PERFORMING IMAGE CORRELATION

Filed July 7, 1965 Sheet 2 of 3

United States Patent Office 3,448,281
Patented June 3, 1969

3,448,281
APPARATUS FOR PERFORMING IMAGE CORRELATION

Arthur S. Jensen, Baltimore, Md., assignor to Westinghouse Electric Corporation, Pittsburgh, Pa., a corporation of Pennsylvania Filed July 7, 1965, Ser. No. 470,108
Int. Cl. H01j 39/12
U.S. Cl. 250—220 4 Claims

ABSTRACT OF THE DISCLOSURE

An apparatus for electronically correlating a first and second radiation image by converting the first and second radiation images into corresponding electron images, storing the first electron image on a target element and imposing the second image on said target element so as to derive a signal which is a function of the product of the first stored electron image and the second electron image. Further, the electron image corresponding to the second radiation image is manipulated electronically so as to determine the variation of this signal with respect to their mutual displacement.

This invention relates to the method and apparatus for performing a correlation between two images and deriving an electrical output signal as a function of the correlation of the two images. More specifically, this invention relates to an electron discharge device capable of storing a first image and correlating the first image with a second signal to thereby obtain the desired output signal.

Generally, correlation (or more specifically cross-correlation) refers to the technique of comparing two mathematical functions by the three operations of displacement, multiplication and integration. The mathematics of this technique as applied to a one-dimensional function is discussed in chaper 2 of the text by Y. W. Lee, "Statistical Theory of Communication," John Wiley and Sons, 1960.

As an extension of this teaching, the techniques of correlation may be used to compare two images and to derive a signal related to the displacement of the elements within the first and second scenes. The two scenes may be considered to be made up of a series of elements which are disposed at various $x$ and $y$ displacements within each scene. More precisely, correlation is a method of comparison in which the elements of each of the scenes is compared as by multiplying signals related to the elemental areas of each of the scenes and summing these signals over the entire area of both scenes; this process may be represented mathematically by:

$$F(x, y)=\int_{-X}^{X}\int_{-Y}^{Y} f(x, y)\cdot g(x+\Delta x, y+\Delta y)dxdy$$

where the function $f(x, y)$ is defined to be zero outside the limits of integration; that is, outside the limits of the scene.

In the past, correlation has been performed by comparing two photographic transparencies or slides with the use of a light source and a photomultiplier device. Typically, the scenes of the two slides were oriented together and the photomultiplier disposed so as to receive the light transmitted through both of the transparencies. In this manner, it may be understood that the individual elements of each transparency are being compared with corresponding elements of the other transparency, and an output signal is derived which represents the intensity of the corresponding element of each scene respectively multiplied times each other; further, the photomultiplier integrates each of the elemental products of the scenes being viewed over the entire area of the smaller scene thereby to achieve a correlation signal of these two scenes.

In order to obtain a signal represenative of the displacement or differences between the two scenes, the first scene is moved relative with respect to the second scene while a measuring device such as a photomultiplier sums or integrates the radiation received over the entire area of the smaller scene. It may be understood that if a scene is correlated or compared with itself that the correlation function or signal will have a maximum when the displacement between the two scenes is zero. This type of operation has many uses where it is desired to identify unknown pictures or scenes. For example, the spectrum of a chemical element, the identity of which is unknown, is represented on a slide or transparent film by transverse opaque lines. On the other hand, the spectrum of known elements is represented on a series of other slides or upon a strip. In order to identify the unknown element, the first slide or transparency is aligned with each of the slides of the known elements and a light radiation transmitted therethrough is detected by a photomultiplier tube as described above. The information recorded upon each of the transparencies can be thought of as expressions or functions which are being multiplied and integrated together by this apparatus. When the slide with the unknown element comes into exact correlation with the second slide with a known element thereon, the detector response will be at a maximum, indicating that the two spectra are identical and therefore represent the same element. In a manner very similar to this, radar patterns as taken from airplanes may be quickly compared with the radar patterns of known cities so as to identify the city or the area over which an airplane may be flying.

Further, the method of correlation may be used to compare two scenes which though not identical are very similar to each other. For instance, after recording a first scene by such means as a rapid process photographic camera, it may be desired to perform a correlation with the same scene a few moments later. The scene as viewed at the later moment will probably have changed in the interim due to the movement of some object within the boundaries of the scene; it is often desired to detect the movement of this object and to derive a signal representative of this movement. Typically, this has been accomplished in the prior art by taking a first photographic transparency of the scene and taking a second transparency of this scene after a predetermined time interval in which some element of this scene has changed. The two transparencies are then compared in the manner described above. Typically, a light source is directed through both of the transparencies and the resulting light image is sensed by a photomultiplier tube. In order to derive an output signal, one of the transparencies is moved as in a linear direction and the resulting signal is recorded as a function of the displacement of the first scene with respect to the second scene. It is noted that if the two transparencies contain an identical scene, that a very noticeable maximum would be obtained when the exact coincidence between the scenes was achieved. However, if the two scenes differ in some respect, a signal output can be derived depicting the amount of displacement for a corresponding output signal from the photomultiplier tube. By comparing this signal or graph with other output signals for known displacements, the nature of the movement within the second scene may be discovered. Further, though usually the displacement is in the linear X or Y direction, the displacement may take place as a rotation about some point in the scene or the scene may be correlated by simply magnifying one image with respect to the other to obtain a point of maximum correlation.

As is evident from the above discussion, the correlation of the prior art has been conducted by recording the two scenes or images on a transparent medium such as a photographic film and then mechanically moving one transparency with respect to another to obtain the desired output signal. Obviously, such a method is slow in that the physical movement of the scenes has to be performed at a limited speed, and that the sensing of this movement cannot take place at any faster rate than the imparted movement. Further, the taking and the developing of the photographic transparencies is an inherently slow process even though performed by the relatively rapidly developing processes of today. In addition, there exists the problems of correlating the mechanical movement with the electrical output from the photomultiplier tube which may introduce an inaccuracy in the desired correlation process.

Accordingly, an object of the present invention is to provide a new and improved method and apparatus for electronically correlating two images.

Another object of this invention is to provide a new and improved method and apparatus for correlating a pair of images without an intermediate step of preparing photographic slides or transparencies.

A still further object of this invention is to provide a new and improved method and apparatus for electronically correlating two images at a high rate of speed without the necessity of preparing photographic or other permanent transparencies and without the necessity of physically manipulating the two transparencies with respect to each other.

Briefly, the objects of this invention are accomplished by providing an apparatus capable of converting a first radiation or optical image into a corresponding electron image, and storing the electron image in a manner that it may non-destructively influence a second electron image correspoding to a second radiation image directed upon this apparatus so as to derive a signal which is the function of the product of the first stored electron image and the second electron image. Further, the electron image corresponding to the second radiation or optical image is manipulated electronically as by a magnetic or an electrostatic field so as to determine the variation of this derived signal with respect to their mutual displacement as provided by the imposed field.

In one exemplary embodiment of this invention, an electron discharge device is provided with a photocathode element for converting the light image incident thereon into corresponding electron images. A storage target element is also provided which is capable of storing the first electron image so as to modulate or influence non-destructively the second electron image incident thereon. More specifically, the target may include a plurality of storage elements disposed in substantially the same plane as an electrically conductive backplate. Further, there is provided in this exemplary embodiment a magnetic coil disposed between the photocathode element and the storage element to provide the desired manipulation of the second electron beam in a linear dimension. It is noted, however, that means may be provided to displace or manipulate the second electron image rotationally or to magnify the second electron image with respect to the first image stored upon the target element.

Further objects and advantages of the invention will become more apparent as the following description proceeds and features of novelty which characterize the invention will be pointed out in particulary in the claims annexed to and forming a part of the description. For a better understanding of the invention, reference may be had to the accompanying drawings in which:

FIG._ is a schematic illustration or a system incorpodischarge device incorporating the teachings of this invention;

Figure 1:
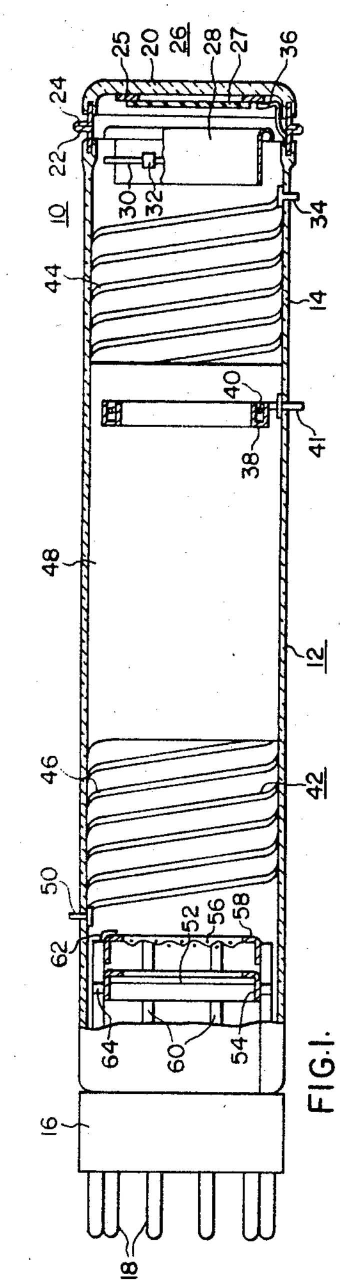
Figure 2:
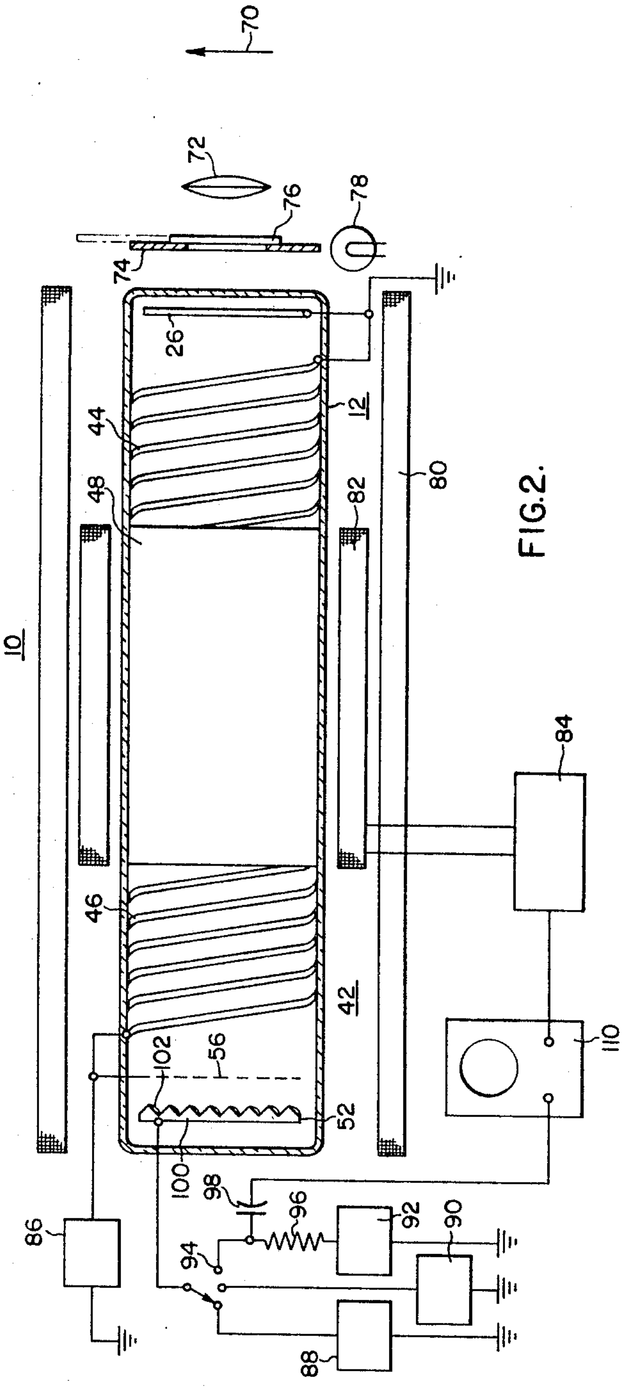
FIG. 2 is a schematic illustration of a system incorporating the device of FIG. 1 for performing the correlation of two images as taught by the teachings of this invention.

Referring now to the drawings and in particular to FIGS. 1 and 2, there is shown a device and a system for performing electronically correlation between two images as taught by this invention. A photocorrelator storage tube 10 is shown in FIG. 1 comprising an envelope 12 with a cylindrical portion 14 made of a suitable insulating material such as glass and enclosed upon one end by a base 16 through which extend a plurality of electrically conductive terminals 18; the other end is enclosed by a face plate 20 made of a suitable light transmissive material such as glass, with flat, parallel surfaces of optical quality. The face plate 20 is secured to the cylindrical portion 14 by a pair of annular flanges 22 and 24 made of a suitable material such as Kovar alloy (W.E. Corp. trademark for an alloy of nickel, iron and cobalt); the annular flanges 22 and 24 are respectively fused to the cylindrical portion 14 and the face plate 20, and are joined together as by heli-arc welding.

A photocathode element 26 is disposed on the interior surface of the face plate 20 and includes a suitable photoemissive coating 27 which is sensitive to the input radiation. A suitable electrical contact to the photoemissive coating 27 may be provided in the form of a conductive ring 25. In the instance where the input radiation is visible light, the photoemissive coating 27 may be made of a suitable material such as cesium antimony which may be formed upon the inner surface of the face plate 20 by well known techniques. More specifically, there is provided within the envelope 12 an annular shielding member 38 within which is disposed a tubing 40 which acts as a source of the cesium, being contained in the tubing in the form of cesium chromate. The shielding member 38 is supported as by terminals 41 which also serve to make electrical connection to the tubing 40. Further, a cylindrical member 28 is provided as shown in FIG. 1 upon which is mounted a wire 30 with a plurality of beads 32 of antimony metal deposited thereon. The cylindrical member is mounted as by terminals (not shown) which serve also to provide a potential to the wire 30. In order to deposit the photoemissive coating 27 upon the face plate 20, the wire 30 which has beads 32 of antimony thereon will be energized and a vapor of antimony will be emitted therefrom to coat the face plate 20. Next, the tubing 40, which typically contains a cesium chromate, may be energized to thereby emit cesium as a vapor which will react with the layer of antimony to form a suitable photoemissive coating 27.

The flanges 22 and 24 may be used to provide an electrical connection to the photocathode element 26. Specifically, a conductive strip 36 interconnects the flange 24 and the conductor ring 25 of the photocathode element 26. Further, an electron accelerating means 42 is provided along the length of the cylindrical portion 14 of the envelope 12 in order to accelerate the electrons emitted by the photocathode element 26. The electronic accelerating means 42 may include a first spiral electrode 44 on the interior surface of the cylindrical portion 14 adjacent the photocathode element 26. One end of the first spiral electrode 44 is electrically connected to the terminal 34, which is directed through and fused to the cylindrical portion 14 of the envelope 12. A second spiral electrode 46 is disposed at the other end of the cylindrical portion 14 and is electrically connected to a terminal 50 which is disposed through and fused to the cylindrical portion 14. An equipotential electrode 48 is disposed intermediate of and in electrical connection with the first and second spiral electrodes 44 and 46. Typically, the first and second spiral electrodes 42 and 44 and the electrode 48 may be formed by first evaporating a thin layer approximately one micron in thickness of a suitable electrically resistance material such as chromium upon the interior surface of the cylindrical portion 14. Then, portions of the thin layer may be removed as by a lathe to form the first and second spiral electrodes 44 and 46. Alternatively, these electrodes could be formed of a resistive paint such as Aquadag (a trademark of the Acheson Colloids Corp. for an aqueous colloidal suspension of graphite—typically 22% carbon) which is painted upon the interior surface of the envelope 12 in the desired configuration. While the aforesaid spiral electrodes 42 and 44 are considered superior in performance, it is understood that the more conventional cylindrical electrodes disposed along the length of the envelope 14 can be used as the acceleration electrodes.

Within the opposite end of the Photocorrelator device 10, there is disposed a storage target element 52, which has been mounted upon a cylindrical support ring 54. A mesh electrode 56 is disposed in a plane parallel to and spaced from the surface of the storage target element 52. Further, the mesh electrode 56 is, in turn, supported by a ring 58. The storage target element 52 and the mesh electrode 56 are both mounted as shown in FIG. 1 by insulating support tubes 60 which are secured within the base 16. In particular, a plurality of tabs 64 are disposed about the tubes 60 and secured as by spot welding to the surface of the rings 54 and 58. Further, appropriate electrical connections are made by conductive wires 62 to each of these electrodes.

Figure 3:
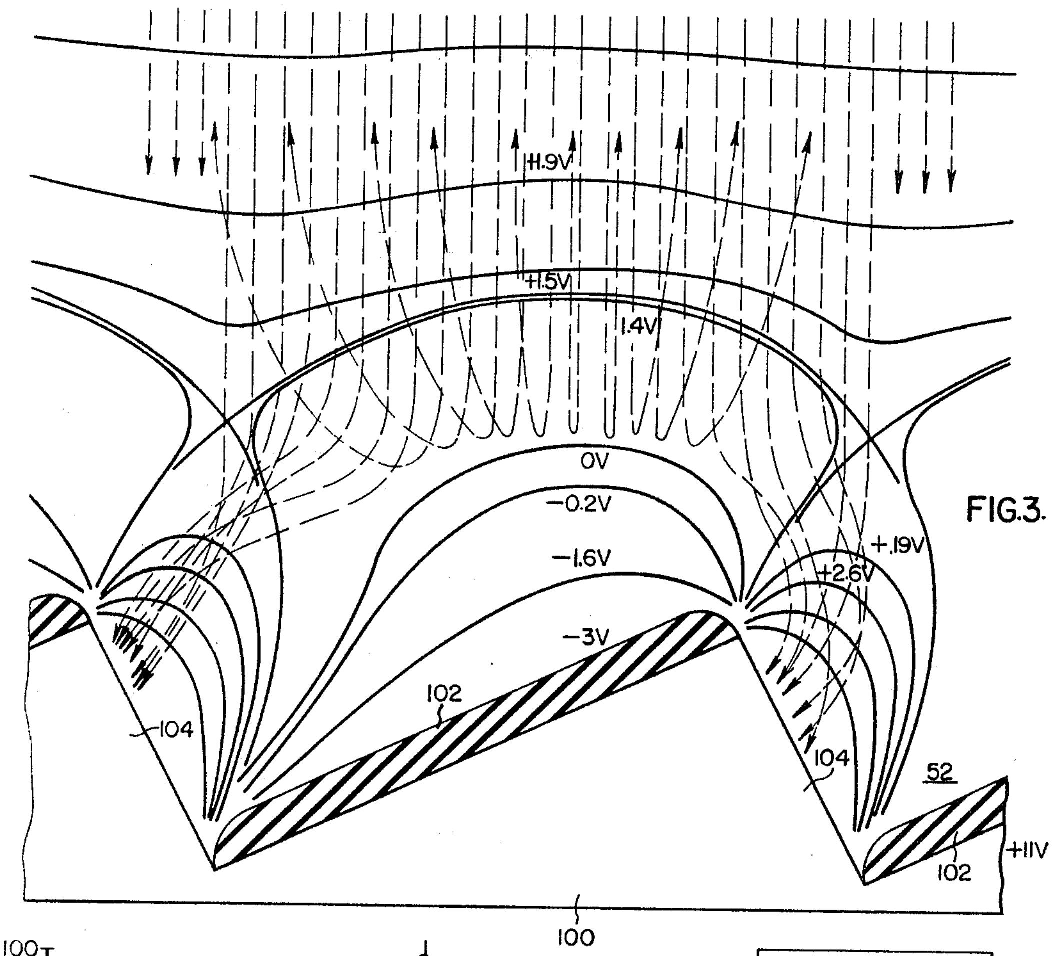
FIGS. 3 and 4 are enlarged views of target elements which may be incorporated within the device shown in FIG. 1.
Figure 4:
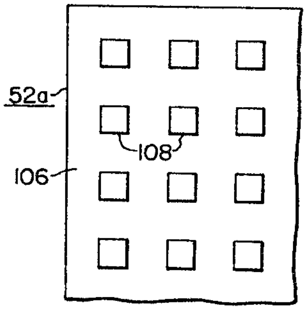

Referring now to FIGS. 3 and 4, specific embodiments of the target element 52 will be as shown and explained. Referring to FIG. 3, there is shown a storage target element 52 including a conductive backplate 100 made of an electrically conductive material such as a stainless steel or a nickel alloy, which is embossed by a series of grooves 104 which are disposed parallel of each other along the length of the target element 52. The embossing may be accomplished by pressure contact with a roller having a series of grooves formed circumferentially in its surface. A plurality of dielectric storage elements 102 or strips are shadow evaporated onto one face of the grooves 104 so that these elements lie on planes or surfaces which are transverse to that of the storage element 52. The elements 102 may be made of a suitable storage dielectric material such as magnesium fluoride, potassium chloride, calcium fluoride, quartz or a crystalline magnesium oxide. A particular advantage of the target element shown in FIG. 3 resides in the very high resolution obtainable with these elements due to the fact that a great number of the grooves 104 may be disposed upon the target element 52 by the methods presently available in the art. For a more complete description of the target element 52, reference is made to the copending application, Serial No. 136,330, entitled "A Storage Tube and Target Element Therefor Having An Irregular Surface," by Jensen and Reininger, and assigned to the assignee of this invention.

Referring now to FIG. 4, an alternative embodiment of the target element is shown. Specifically, a target element 52*a* includes an electrically conductive backplate 106 with a plurality of islands or elements 108 of a suitable dielectric storage material disposed thereon in a regular fashion. Typically, the dielectric elements 108 may be formed by evaporation through a very fine mesh. In the alternative, a layer of the storage material may be disposed on the conductive backplate 106 with a second coating thereon of a photoresist material which will be exposed and developed in a manner well known in the art to thereby provide a plurality of the discrete elements 108. In another embodiment, the dielectric elements may be disposed on a conductive backplate so that the surface of the islands is substantially flush with the surface of the conductive backplate as by either impressing a fine mesh screen into a slightly molten layer of a suitable dielectric material or by depositing by evaporation and photoresist methods, well known to the art, a fine mesh screen or grille of metal on a suitable dielectric plate such as glass or quartz. It is understood that in all of these alternative embodiments the dielectric elements may be a grille of strips instead of a matrix of separate islands; both have been used with success.

In order to achive the desired operation, the unitary target elements as shown in FIGS. 3 and 4 must be constructed so that the surfaces of the metal portions and the dielectric portions lie substantially in the same plane. Specifically, the surfaces of the backplate 100 and the surface of the elements 102 should not be displaced more than about one-half the width of the dielectric element. As will be explained later, if this condition is not met, the effect of the charges as first stored upon the dielectric islands 102 will be decreased and the target element will become less effective in the desired operation. However, in another embodiment of the target element 52 which may be incorporated into the Photocorrelator device 10, a fine mesh is coated with the dielectric material which has a capability of storing electron charges and a backplate is spaced from the rear surface of the coated mesh. In order to overcome in part the decrease of sensitivity of the target element 52, an increased positive potential is applied to the backplate in order to attract the electrons through the openings of the coated mesh.

Referring now to FIG. 2, there is shown a correlator system incorporating the correlator device 10 shown in detail in FIG. 1. More specifically, the system includes a suitable lens system 72 for focusing the radiations emitted from a scene 70 onto the photocathode element 26. A shutter 74 is disposed between the lens system 72 and the face plate 20 of the Photocorrelator device 10; in particular, the shutter includes a movable element 76 which may be actuated from a closed position 1 to an open position 2 in order to allow radiations focused by the lens system 72 to be directed upon the photocathode element 26. A light source 78 such as a lamp is provided to excite uniformly and flood the photocathode element 26 with light.

A suitable focusing means such as an elongated electromagnetic coil 80 is disposed along the length of the envelope 12 of the Photocorrelator device 10 to focus the electrons emitted by the photocathode element 26 onto the storage target element 52. Further, a deflection means 82 such as a standard image orthicon deflection coil is disposed about the cylindrical portion 14 of the envelope 12; more particularly, the deflection means 82 is disposed about the equipotential electrode 48 to ensure that no undesired rotational component is imposed upon the electron beam emitted by the photocathode element 26. Within the volume defined by the electrode 48, the potential established by the electrode remains substantially constant; as a result, the magnetic field generated by the combination of the deflection coils and the focusing coil only imparts a linear transverse displacement to the electron beam being directed upon the target element 52.

A potential source 86 is interconnected between ground and the mesh electrode 56 such that the mesh electrode is approximately 250 volts positive to ground. The terminal end of the second spiral electrode 46 is also connected to the mesh electrode 56. Further, a connection is made through the envelope 12 from the conductive backplate 100 of the storage target element 52 to a switching means 94. The switching means 94 may be sequentially disposed in each of three positions. In the first and second positions, the switching means 94 may be respectively connected to the potential sources 88 and 90. In the third position, the conductive backplate 100 may be connected through an impedance 96 and a potential source 92 to ground. Further, the output signal of the Photocorrelator device 10 is derived while the switching means 94 is in the third position; in particular, the signal as developed across the impedance 96 may be fed through a capacitance 98 into an oscilloscope 110. A variable current source 84 is connected with the deflection means 82 to vary the magnetic field generated by the deflection means 82 transversely of the path of the electrons emitted by the photocathode element 26. Further, the variable current source 84 is also connected to the oscilloscope 110, so that the output signal may be displayed as a function of the deflection imparted to the electron beam directed upon the storage target element 52.

The operation of the correlation system shown in FIG. 2 requires the performance of a three part cycle. The three steps of the operation include (1) erasing and/or priming, (2) exposure to the first image, and (3) exposure to the second image.

(1) *Priming*

During the first step of the operating cycle, the conductive backplate 100 of the target element 52 is set at a potential with respect to that of the cathode element 26 of approximately 14 volts positive. This is accomplished by connecting the backplate 100 to the potential source 88 through the switching means 94. The light source 78 is energized to cast a uniform light upon the photocathode element 26. In turn, the photocathode element 26 emits a uniform electron beam which is accelerated by the accelerating means 42 to flood the target element 52. As a result, the surface of the dielectric elements 102 is driven to the potential of the photocathode element 26 which is at ground. Thus, in this exemplary method of operating the correlation system of FIG. 2, the surface of the dielectric elements 102 have been set at a potential of approximately 14 volts negative with respect to the potential of the backplate 100.

(2) *First exposure*

After the priming step, the switching means 94 is disposed in the second position where the conductive backplate 100 of the target element 52 is connected to the potential source 90 which is approximately 314 volts with respect to ground. It may be understood that due to the capacitive action between the backplate 100 and the surface of the dielectric elements 102 that the surface of the dielectric islands 102 is therefore set at approximately 300 volts with respect to ground. Next, the movable element 76 of the shutter 74 is moved to the open position 2 and the radiations from the scene 70 are focused as by the lens system 72 upon the photocathode element 26. The photocathode element 26 converts the radiation image into a corresponding electron image which is accelerated as by the electron accelerating means 42 onto the storage target element 52.

As is well known in the art, storage dielectric materials have regions of response (i.e., below the first crossover potential and above the second crossover potential) in which the incident electrons will generate a number of secondary electrons less than the number of incident, primary electrons bombarding the surface of this material. On the other hand, if the primary electrons are accelerated with a voltage above a given value (between first and second crossover potential), the number of secondary electrons emitted will be greater than the number of incident primary electrons. Thus, during the exposure to the first image, the backplate 100 of the target element 52 is set at a point between the first and second crossover potential of the storage material of the islands 102 so that more secondary electrons are emitted than incident primary electrons. Under these conditions, the secondary electrons will be emitted or thrown off from the surface of the elements 102; the free electrons will either be attracted by the mesh electrode 56 or the exposed portions of the electrically conductive backplate 100. As a result, there is a net loss of electrons and the surface of those dielectric islands 102 which have been bombarded by electrons will be driven positively with respect to those islands 102 which have not been so bombarded. After the electron image corresponding to the first image from scene 70 has been integrated for a sufficient period of time by the target element 52, the shutter 74 is closed (i.e., position 1). Since this secondary emission of electrons is proportional to the number of incident electrons in the beam, the charge pattern on the surface of the islands 102 that results from this exposure corresponds both in position and amplitude to the light values in the scene 70. At this point in the exemplary operating cycle, those dielectric islands 102 which have been bombarded with primary electrons will be charged to a level of approximately 302 volts with respect to ground or 12 volts negative with respect to the potential of the backplate 100.

(3) *Second exposure*

After a charge pattern has been disposed upon the surface of the dielectric islands 102 corresponding to the first image the correlation system may be switched to receive the second image. This may be accomplished by disposing the switching means 94 in its third position so that the electrically conductive backplate 100 is connected through the impedance 96 to the potential source 92 of a value of approximately 11 volts. Due to the capacitive coupling between the conductive backplate 100 and the dielectric elements 102, the surface of those particular dielectric elements 102 which have been charged during the first exposure has a potential thereon of approximately one volt negative with respect to ground; the dielectric elements 102 which have not been charged are disposed at a potential of approximately 3 volts negative with respect to ground.

Referring now to FIG. 3, there is shown a cross-sectional view of the target element 52. As explained above with regard to the exemplary method of operation, the backplate 100 is disposed at 11 volts positive with respect to ground whereas the dielectric elements 102 have been charged to a potential of 3 volts negative with respect to ground. Further, FIG. 3 shows the equipotential surfaces as they are distributed from the surface of the dielectric storage elements 102. As explained above, during the first exposure a charge pattern was disposed upon the dielectric elements 102 in accordance with the electron image directed upon the target element 52. It is noted that various dielectric elements 102 may be driven more positive than other elements so that various shades of the image scene may be recorded upon the target element 52. With regard to FIG. 3, the charge of 3 volts negative stored upon the dielectric elements 102 represents an absence of signal being stored upon the target element 52. It is understood that those elements 102 upon which a signal has been recorded will be charged to a correspondingly more positive voltage. As can be seen in FIG. 3, the negative potential surfaces emanating from the dielectric elements 102 tend to cut down the area through which the electrons emitted from the photocathode element 26 can be directed onto the conductive backplate 100. As the dielectric elements are driven more negatively, the negative equipotential surfaces spread and overlap in these particular areas and tend to prevent the landing of the electron beams on the target element 52. In the instance where a more positive charge has been disposed upon the elements 102, the negative equipotential surfaces are distributed more closely to the surface of the dielectric element and a greater passageway is provided to the exposed portions of the backplate 100.

Figure 5:
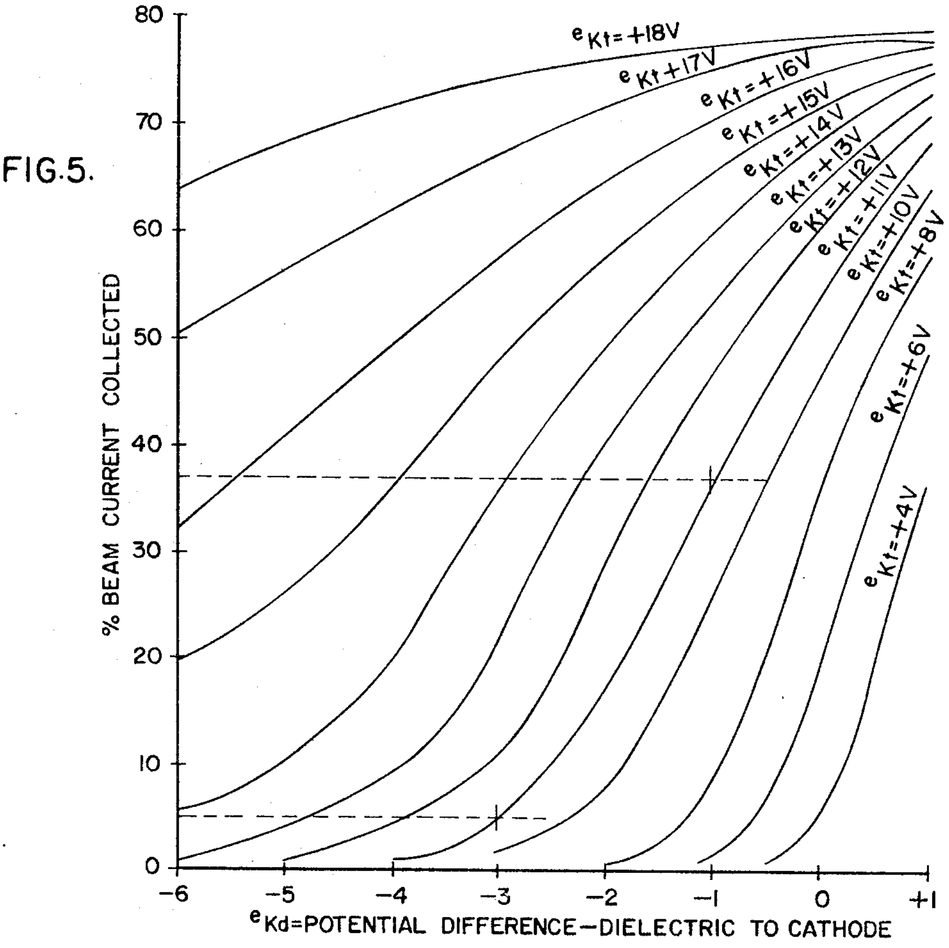
FIG. 5 shows a series of curves representing the current transmission to the target elements shown in FIGS. 3 and 4 as a function of the potential difference between the cathode and storage elements of this device and the potential of the charge stored upon the storage element.

As the dielectric elements 102 are charged more negatively, the reading beam current landing on the backplate 100 is correspondingly decreased. Thus, where there has been established a charge distribution of three volts negative with respect to ground, a relatively small amount of electron current will be allowed to pass through the equipotential surfaces to the conductive backplate 100. As the dielectric elements 102 are charged more positively, more electrons will be allowed to pass through to the conductive backplate and a larger electron current signal will thereby be derived. Referring now to FIG. 5, there is shown a series of graphs indicating the percentage of electron beam current collected by the backplate 100 as a function of the potential ($e_{kd}$) between the dielectric elements 102 and the photocathode element 26, and the potential ($e_{kt}$) between the backplate 100 and the photocathode element 26. In the exemplary method of operation where a potential of 11 volts positive with respect to ground has been established on the backplate 100, FIG. 5 indicates that approximately 5 percent of the electron beam emitted by the photocathode element 26 will penetrate through the equipotential surfaces to the backplate 100 in the instance where there has been established a charge of minus 3 volts negative upon the dielectric island 102. Where there has been a signal detected by the Photocorrelator storage tube 10 and a more positive charge established upon the dielectric islands 102 as during the first exposure, an increased percentage (approximately 36% for a potential of −1 v.) of the electron beam will be received by the backplate 100. Thus, the reading beam current directed upon the backplate 100 is inversely proportional to the negative voltage established upon the dielectric islands 102 and directly proportional to the intensity of the electron image disposed upon the target element 52 during the first exposure.

During the second exposure, the radiation from the scene 70 is directed onto the photocathode element 26; an electron image corresponding to the second radiation image is directed over substantially the entire area of the target element 52. Since the target element 52 is not being scanned as in a typical television tube readout by a narrow pencil beam of electrons, the signal derived from the backplate 100 is a function or a summation of all the electron currents received over the surface of the target element 52. In other words, the electron current or signal derived from the backplate 100 is a signal representing the integration of the various currents derived from each element or portion of the target element 52. Further, the current derived through a portion of the backplate 100 is in turn a function of the charge stored upon the dielectric element 102 associated therewith during the first exposure and a function of the density of electrons emitted by the photocathode element 26 during the second exposure. This may be represented mathematically as:

$$I_{out}=\int\int i_2(x+\Delta x,\ y+\Delta y)\cdot q_1(x,\ y)dxdy$$

where $i_2(x+\Delta x, y+\Delta y)$ represents the electron image directed upon the target element 52 during the second exposure and $q_1(x, y)$ represents the charge distribution stored upon the target element 52 during the first exposure. Thus, it may be understood that the output signal derived from the photocorrelator tube 10 accurately represents a correlation function of the first and second scenes taken respectively during the first and second exposures of the Photocorrelation tube 10.

In order to sense a change in the composition of scene 70 between the first and second exposures, the charge image as stored upon the dielectric element 52 and the electron image representing the scene view during the second exposure should be varied or displaced with respect to each other in order to obtain the instantaneous maximum output signal. This displacement corresponds to the occurrence of $\Delta x$ and $\Delta y$ in the correlation function set out above. Referring to FIG. 2, there is shown an exemplary means for obtaining a linear displacement of the electron image emitted from the photocathode element 26 during the second exposure. It is noted as will be explained later that this electron image could be manipulated in different modes of operation such as in a rotational mode or by varying the magnitude of the second image with respect to the first image. More specifically, the source 84 supplies a sawtooth current to the deflection means 82 which in turn provides a deflection field across the cross section of the envelope 12. The electron image is thereby displaced linearly in accordance with this electric field and the points of incidence of the electron image upon the storage element 52 will thereby vary in a linear manner.

Figure 6:
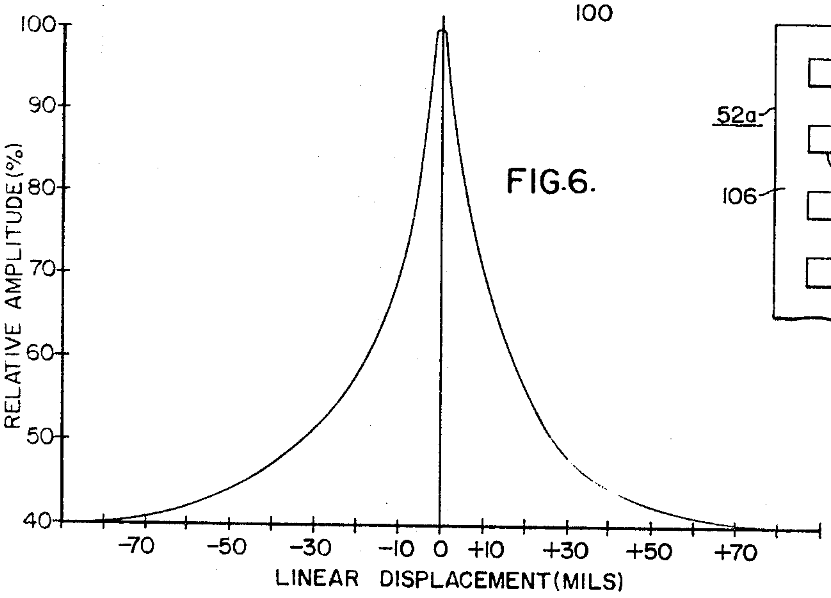
FIG. 6 shows a curve representing the integrated output signal of the target elements of FIGS. 3 and 4 as a function of the manipulation or displacement of the electron image upon the aforementioned target elements.

In FIG. 6 a cross-sectional curve is shown where a second identical image has been correlated with a first image by linearly displacing the second image with respect to the first image. At that point where there is zero or no displacement, a maximum (or a minimum, depending upon the polarity of the signals) will be derived from the backplate 100. As the second image is displaced from the first image, the signal will correspondingly be decreased due to the lack of correspondence between the elements of the two images being correlated with each other. It may be understood that where the images viewed upon the photocorrelator tubes 10 are not identical but where there is a deviation due to the movement of some object within the second image, there will be achieved a maximum output signal where there is the closest correspondence between the elements of the first and second images. The degree to which the first and second images are similar to each other is indicated by the slope and the amplitude of the maximum signal derived from the target element as a function of displacement. The curve so obtained may be compared with correlation curves for known changes in the image viewed to thereby determine the nature of the movement in the second image.

In the exemplary embodiment of the correlator system shown in FIG. 2, the output signal from the target element 52 is connected during the second exposure to the oscilloscope 110. Further, a signal representing the displacement or manipulation of the second image with respect to the first image is derived from the current source 84 and applied to the oscilloscope 110. Thus, the signal displayed upon the oscilloscope 110 represents the amplitude of the output current drawn from the target 52 for a given displacement of the electron image corresponding to the second exposure. If a sawtooth current having a cycle of approximately 6 frames per minute is provided by the current source 84, an operator could easily view the output current from the target element 52 and the resultant maximum for a given displacement upon the oscilloscope 110. Further, a time exposure by a photographic camera of approximately the duration of this cycle could be taken to have a permanent record of this output signal displayed upon an oscilloscope 110.

Figure 7:
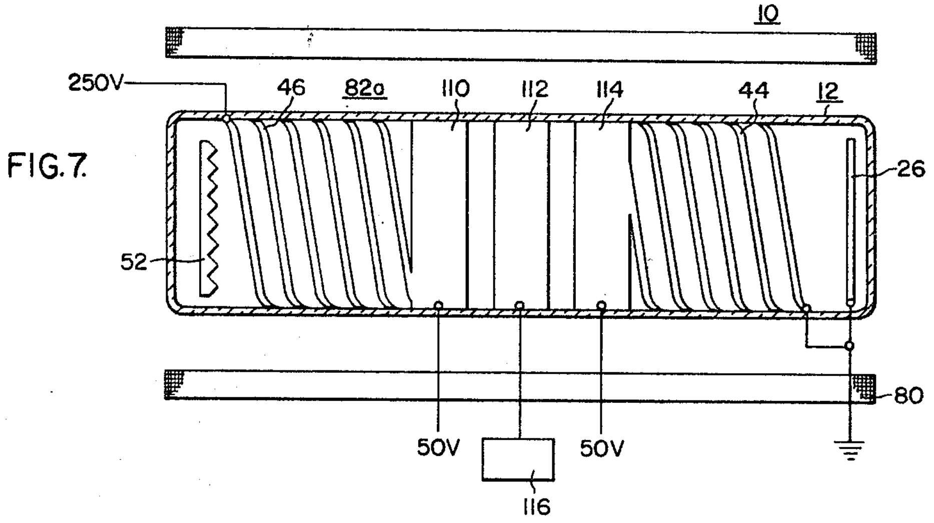
FIG. 7 is a schematic illustration of an alternative system and device for performing the correlation of two images.

As explained above, it may be desirable to manipulate the second image with respect to the first image by other than a linear displacement. As shown in FIG. 7, there is shown an exemplary embodiment of a Photocorrelator tube 10 in which the displacement of the second image with respect to the first image may be accomplished by rotating the electron image derived during the second exposure rotationally with respect to the pattern of charges deposited during the first exposure upon the target element 52. As described above, the photocorrelator tube 10 includes an envelope 12 in which there is disposed at one end the photocathode element 26 and at the other end the storage target element 52. The focusing means 80 is disposed about the envelope 12 in order to focus the electrons emitted by the photocathode element 26 upon the storage element 52. The first and second spiral electrodes 44 and 46 are disposed as upon the interior of the envelope 12 to accelerate the electrons toward the target element 52. In this embodiment of the invention, a deflection means 82a is provided in order to impart a rotational movement to the electrons emitted from the photocathode element 26. In particular, the deflection means 82*a* includes first, second and third cylindrical electrodes 110, 112 and 114 respectively which may be deposited as by evaporation of a metallic substance upon the interior surface of the envelope 12. A potential of approximately 50 volts is applied to the third cylindrical electrode 114 which is in turn connected to the terminal end of the first spiral electrodes 44. A voltage of approximately 50 volts is applied to the first cylindrical electrode 110 which is in turn connected to one end of the second spiral electrode 46. Further, a variable potention source 116 is applied to the second cylindrical electrode to provide the desired degree of rotation according to the potential applied thereto.

Another erasing phase is now required to restore the surface potential of the target to its initial condition. Referring to FIG. 2, as explained above, the erasing and priming may be performed by flooding the target element 52 with a beam of low energy electrons to thereby drive the potential of the dielectric elements 102 to that of the photocathode element 26 which is disposed at ground. It may be understood that this method of erasing the charge distribution upon the target element 52 is inherently slow because as the potential of the surface of the dielectric element 102 approaches ground potential, the accelerating voltage attracting the electrons to the surface of the dielectric elements 102 becomes increasingly smaller and the process of charging becomes correspondingly slower.

In an alternative method of priming and erasing the target element 52, the dielectric elements 102 are erased in a substantially shorter time by the use of secondary emission from the elements 102. In this alternative mode of operation, the mesh 56 is disposed as heretofore at a potential of approximately 250 volts with respect to ground. Further, a potential (source not shown) of approximately 259 volts is applied to the backplate 100 of the target element 52. The potential applied to the backplate 100 is substantially above the first crossover of the material of which the dielectric elements 102 is made; as a result, secondary electrons will be emitted from the surface of the dielectric elements 102 in response to the bombardment of primary electrons emitted by the photocathode element 26. In order to energize the photocathode element 26, the light source 78 is directed upon the photocathode element 26 and a resulting beam of electrons directed onto the target element 52. Since the dielectric elements 102 have a potential charge disposed on their surface in the range of between minus 12 volts and minus 14 volts with respect to the target backplate 100, the emitted secondary electrons will be drawn toward the mesh 56 and the backpltae 100. Due to the loss of electrons, the surface of the dielectric islands 102 will be driven positively. As the potential of the surface of the dielectric islands 102 becomes more positive, the secondary electrons are essentially attracted to the backplate 100. Due to the attraction to the backplate 100, the secondary electrons from one element 102 will be distributed upon other elements 102 thereby tending to equalize the potential of all of the dielectric elements 102. Eventually, the potential of the surface of the dielectric elements 102 will approach that of the backplate 100. Further, the dielectric islands 102 are then brought to a potential approximately 13 volts negative with respect to the backplate 100 by first applying a potential of approximately 14 volts to the backplate 100 and bombarding the surface of the dielectric elements 102 with a low energy beam of electrons. As a result, the surface of the dielectric elements 102 is driven toward the potential of the photocathode element 102. In this alternative method of priming the erasing, it is not necessary to drive the surface of the dielectric element to zero or ground potential; rather, since the dielectric islands 102 have been established at the same potential, it is only necessary to drive them to approximately one volt positive with respect to ground. It may be understood that the time saved by this alternative method of erasing and priming is primarily due to the fact that charging the surface of the dielectric islands 102 at low accelerating potentials takes a disproportionate length of time.

Thus, there has been shown above a Photocorrelator device capable of storing over an extended period of time a charge distribution corresponding to a first image and using this charge distribution to modulate an electron beam corresponding to a second image. Further, the second electron image may be manipulated or displaced in order to derive a signal representing the integral of the stored charge (first image) multiplied by the electron beam density as a function of the displacement between the first and second images. Such a system could be adapted to identify rapidly a given image as compared with a known image or it could be used to provide an error signal in the guidance of an airborne missile. Further, it is apparent from the above discussion that the correlator system disclosed herein may function very rapidly to obtain the desired information without the necessity of employing photographic slides or transparencies or mechanically manipulating the stored images.

While there have been shown and described what are considered to be the preferred embodiments of the invention, modifications thereto will readily occur to those skilled in the art. It is not desired, therefore, that the invention be limited to the specific arrangement shown and described and it is intended to cover in the appended claims all such modifications which fall within the true spirit and scope of the invention.

I claim as my invention:

1. An apparatus for correlating first and second radiation images emanating respectively from first and second scenes which are composed of elements distributed respectively in accordance with first and second functions, said apparatus comprising:

a photocathode element for converting said first and second radiation images respectively into first and second electron beams, the electron density of said first and second electron beams being distributed in accordance with said first and second functions, a target element disposed to receive said electron beams, an electrode assembly disposed between said photocathode element and said target element including a spiral electrode for accelerating said electron beams along a path toward said target element and an equipotential electrode surrounding said path, a first coil disposed between said photocathode element and said target element for generating a first magnetic field along said path to focus said electron beams on said target element, and a second coil disposed about said equipotential electrode for generating a second magnetic field across said path to effect a linear displaecment of said first electron beam, said target element including a plurality of dielectric elements for receiving said first electron beam and storing a pattern of charges spatially distributed in accordance with said first function and a conductive member for collecting said second electron beam which has been modulated by said pattern of charges to derive an output signal representing the integral of the product of said first and second functions for variations of the linear displacement of said second electron beam.

2. An apparatus for correlating first and second radiation images emanating respectively from first and second scenes which are composed of elements distributed respectively in accordance with first and second functions, said apparatus comprising:

a photocathode element for converting said first and second radiation images respectively into first and second electron beams, the electron density of said first and second electron beams being distributed in accordance with said first and second functions, a target element disposed to receive said electron beams, and displacement means disposed between said photocathode element and said target element and including at least two electrodes disposed about said electron beams and a variable potential source connected to one of said two electrodes for inducing a rotational velocity upon said second electron beam, said target element including a plurality of dielectric elements for receiving said first electron beam and storing a pattern of charges spatially distributed in accordance with said first function and a conductive member for collecting said second electron beam which is modulated by said pattern of charges to derive an output signal representing the correlation of said first and second functions for variations of the rotational displacement imparted to said second electron beam.

3. A system for correlating first and second radiation images emanating from scenes which are composed of elements distributed respectively in accordance with first and second functions, said system comprising:

a photocathode element for converting said first and second radiation images respectively into first and second electron beams, the electron density of said first and second electron beams being distributed in accordance respectively with said first and second functions, an optical system for focusing said radiation images upon said photocathode element, a shutter disposed between said scenes and said photocathode element, a target element disposed to receive said electron beams, an electrode assembly disposed to accelerate said electron beams along a path toward said target element, means disposed about said path for focusing said electron beams upon said target element, and means disposed to generate a deflecting field across said path to effect a displacement of said second electron beam with regard to said target element, said target element including a plurality of dielectric elements for receiving said first electron beam and storing a pattern of charges spatially distributed in accordance with said first function and a conductive backplate, said dielectric elements being disposed upon said backplate in a manner that the surface of said elements and the exposed surfaces of said backplate lie in substantially the same plane, said exposed surfaces of said backplate being disposed to collect said second electron beam which is modulated by said pattern of charges to thereby derive an output signal representing the correspondence of said first and second functions for variations of the displacement of said second electron beam.

4. An apparatus for correlating first and second radiation images emanating respectively from first and second scenes, each of said scenes including a pattern of spatially disposed elements, said apparatus comprising:

a photocathode element for converting the radiation from said first and second scenes into first and second electron beams whose spatial density correspond respectively to the patterns of said first and second scenes, a target element disposed to receive said first and second beams for deriving a signal representing the coincidence of the first and second beams, an accelerating electrode between said photocathode and said target element for accelerating said electron beams along a path toward said target element, a focusing coil means disposed between said photocathode element and said target element for generating a magnetic field along said path to focus said electron beams on said target element, a deflecting coil means disposed between said accelerating electrode and said target element for generating a second magnetic field across said path to effect displacement of said electron beams, and means associated with said deflecting coil means to establish an equipotential electrostatic field within the volume of the electron beam path influenced by said deflecting coil magnetic field to establish a linear, transverse displacement of the electron beams by said deflecting coil means.

References Cited

UNITED STATES PATENTS

| | | | |
|---|---|---|---|
| 2,667,596 | 1/1954 | Szegho et al. | 315—11 X |
| 2,768,309 | 10/1956 | Phillips et al. | 250—220 X |
| 2,858,463 | 10/1958 | Koda et al. | 315—12 X |
| 3,290,546 | 12/1966 | Link et al. | 315—11 X |

JAMES W. LAWRENCE, *Primary Examiner.*

R. F. HOSSFELD, *Assistant Examiner.*

U.S. Cl. X.R.

315—12